2,736,736

DEHYDROCHLORINATION OF GAMMA-CHLOROPROPYL CHLOROSILANES

Arthur N. Pines, Snyder, and Edward R. York, Tonawanda, N. Y., assignors to Union Carbide and Carbon Corporation, a corporation of New York No Drawing. Application August 12, 1954, Serial No. 449,519

12 Claims. (Cl. 260—448.2)

This invention relates to a process of dehydrochlorinating gamma-chloropropyl chlorosilanes. More particularly the invention relates to a process of dehydrochlorinating gamma-chloropropyl chlorosilanes whereby allyl chlorosilanes are prepared at high production rates in pure form and in desirable yields.

It is known that monochloroethyl and dichloroethyl chlorosilanes may be dehydrochlorinated by reacting those compounds with bases, for example, the tertiary amines such as quinoline or picoline in an amount chemically equivalent to or in excess of the hydrogen chloride to be removed. The mechanism of this reaction may be illustrated by the following equation representing the dehydrochlorination of alpha, beta-dichloroethyl trichlorosilane:

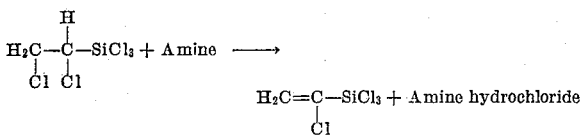

It is also known that the above processes of dehydrochlorinating monochloroethyl and dichloroethyl chlorosilanes are not particularly effective in dehydrochlorinating gamma-chloropropyl chlorosilanes. Heretofore considerable effort has been expended toward finding methods for dehydrochlorinating such gamma-chloropropyl chlorosilanes as the unsaturated products obtained thereby, namely allyl chlorosilanes, are extremely desirable starting materials in the field of silicon chemistry.

We have found that gamma-chloropropyl chlorosilanes may be dehydrochlorinated by a process which comprises heating such compounds in the presence of small amounts of isoquinoline or of isoquinoline hydrochloride at a temperature of from about 180° C. to about 220° C., and generally under reflux conditions, to evolve hydrogen chloride and removing the evolved hydrogen chloride from the reaction zone. The amount of isoquinoline or of isoquinoline hydrochloride which may be employed in the process of the present invention may vary from about 5 per cent to about 40 per cent by weight of the gamma-chloropropyl chlorosilane being dehydrochlorinated.

The process of this invention is particularly applicable to the dehydrochlorination of gamma-chloropropyl trichlorosilane to obtain allyl trichlorosilane. However, the process, as hereinbelow illustrated, is also applicable to the dehydrochlorination of gamma-chloropropyl alkyl chlorosilanes, such as gamma-chloropropyl methyl dichlorosilane, gamma-chloropropyl dimethyl monochlorosilane, gamma-chloropropyl ethyl dichlorosilane and the like.

Those conditions hereinabove defined with respect to temperature and isoquinoline or isoquinoline hydrochloride concentrations under which gamma-chloropropyl chlorosilanes are dehydrochlorinated are critical for the effective operation of the process, specifically, if the process is conducted at temperatures below about 180° C. dehydrochlorination does not take place. If, on the other hand, the process is conducted at temperatures above about 220° C. the efficiency of the reaction is seriously impaired.

With respect to the amount of isoquinoline or of isoquinoline hydrochloride employed it has been found that concentrations thereof above about 40 percent by weight are not conducive to the effective operation of the process. For example, when employing these compounds in such higher concentrations in dehydrochlorinations conducted under reflux conditions, sublimation of isoquinoline residues occurs and crystalline white solids are found in the distilling column. On the other hand the use of such higher concentrations in dehydrochlorinations conducted without reflux that is, by heating a mixture of the chlorosilane and isoquinoline or isoquinoline hydrochloride at temperatures between 180° C. and 220° C., creates difficulties in the separation of the allyl chlorosilanes from the residue of the reaction.

One method of conducting the dehydrochlorination of the instant invention comprises charging a gamma-chloropropyl chlorosilane, such as gamma-chloropropyl trichlorosilane together with an appropriate amount of isoquinoline or of isoquinoline hydrochloride to a flask and heating to a temperature within the range set forth above. Hydrogen chloride is evolved from the reaction mixture and is vented by suitable means to a hood. Heating is continued until the evolution of hydrogen chloride ceases at which time allyl trichlorosilane may then be separated from the material remaining in the flask by fractional distillation.

The preferred embodiment of the invention comprises conducting the reaction under reflux conditions and providing for the removal of the products of the reaction, namely hydrogen chloride and an allyl chlorosilane, in a single operation. This is possible as the allyl chlorosilane product normally has a boiling point below the temperature at which the reaction is conducted. In the practice of this embodiment of the invention the reaction may be conducted by heating at a temperature of from about 180° C. to about 220° C. a gamma-chloropropyl chlorosilane such as gamma-chloropropyl trichlorosilane with an appropriate amount of isoquinoline or isoquinoline hydrochloride in a flask connected to a distilling column packed with glass helices and provided with a still head and receiver. Shortly after reflux conditions are established the gaseous products of the reaction mixture pass to the still head where the hydrogen chloride product is vented and the gaseous chlorosilane product condensed and passed to a receiver. If desired a portion of the condensed chlorosilane product may be returned to the column to be redistilled thus insuring a purer product.

When practicing the invention in accordance with the preferred embodiment thereof, dehydrochlorination of gamma-chloropropyl chlorosilanes may be conducted by a continuous operation. This is accomplished by providing means for the continual addition of the starting material to the reaction mixture at a rate equal to that at which the products are collected. By so doing, small amounts of isoquinoline or of isoquinoline hydrochloride may be employed to dehydrochlorinate large quantities of a gamma-chloropropyl chlorosilane.

The following examples are illustrative of the invention:

EXAMPLE I

A 500 cc. still kettle equipped with a thermometer well and a liquid entry tube extending from a feed tank was connected to a 20 x ¾-inch jacketed distilling column (packed 12 inches with ⅛ inch glass helices) equipped with a still head and receiver. The receiver for the distilling column was vented through a trap chilled with Dry Ice. Approximately 43 grams of isoquinoline was placed in the kettle and about 135 grams of gamma-chloropropyl trichlorosilane charged thereto from the feed tank. The contents of the kettle were heated to reflux (kettle temperature 190–210° C.) to initiate the reaction. Hydrogen chloride and allyl trichlorosilane evolved from the reaction mixture with the hydrogen chloride product vented and the allyl trichlorosilane product collected in the receiver. Gamma-chloropropyl trichlorosilane was added to the kettle from the feed tank at a rate equal to that at which allyl trichlorosilane was collected in the receiver. In this manner the liquid level in the kettle remained essentially constant throughout the operation. The following log was taken of the continuous dehydrochlorination of a total of 1641 grams gamma-chloropropyl trichlorosilane.

*Table I*

| Reaction Time, hours | Temp. (° C.) Kettle | Temp. (° C.) Take-off | Product Rate grams/ hour | Analysis of Product Weight—% |
|---|---|---|---|---|
| 8 | 195 | 120 | 21.5 | 86.6 allyl trichlorosilane (380 grams). 9.0 gamma-chloro-propyl trichlorosoline. 94.5 allyl trichlorosilane (630 grams). 2.4 gamma-chloro-propyl trichlorosilane. |
| 16¾ | 190 | 120 | 18.0 | |
| 25 | 192 | 120 | 13.5 | |
| 32¼ | 194 | 115 | 9.7 | |
| 40½ | 192.5 | 115 | 9.5 | |
| 49 | 203 | 115 | 18.0 | |
| 57 | 207 | 115 | 21.5 | |
| 65 | 210 | 115 | 23.0 | |

EXAMPLE II

Following the procedure disclosed in Example I and employing the apparatus described therein, 55 grams of isoquinoline hydrochloride was placed in the kettle and about 135 grams (100 cc.) of gamma-chloropropyl trichlorosilane charged thereto from the feed tank. The contents of the kettle were heated to reflux (kettle temperature 195–200° C.) to initiate the reaction. Hydrogen chloride and allyl trichlorosilane evolved from the reaction mixture with the hydrogen chloride produced vented and the allyl trichlorosilane product collected in the receiver. Gamma-chloropropyl trichlorosilane was added to the kettle from the feed tank at a rate equal to that at which allyl trichlorosilane was collected in the receiver. In this manner the liquid level in the kettle remained essentially constant throughout the operation. The following log was taken of the continuous dehydrochlorination of gamma-chloropropyl trichlorosilane.

*Table II*

| Reaction Time, hours | Temp. (° C.) Kettle | Temp. (° C.) Take-off | Product Rate grams/ hour | Analysis of Product Weight—% |
|---|---|---|---|---|
| 8 | 200 | 128 | 27.5 | 73.5 allyl trichlorosilane (395 grams). 11.5 gamma-chloropropyl trichlorosilane. |
| 11 | 200 | 125 | 36 | |
| 16 | 190 | 120 | 21.5 | |
| 22 | 195 | 120 | 18 | |

EXAMPLE III

To a round bottom flask connected to a distilling column, packed with glass helices and equipped with a still head and receiver were charged 68 grams of gamma-chloropropyl ethyl dichlorosilane and 3.5 grams of isoquinoline. The contents of the flask were heated to reflux (flask temperature approximately 210° C.). Shortly after reflux conditions were established the gaseous products of the reaction passed to the still head with the hydrogen chloride product vented and the allyl ethyl dichlorosilane product condensed and passed to the receiver. In 8½ hours a total of 52.2 grams of product was made to the receiver. Analysis of the product indicated that 42.1 grams of allyl ethyl dichlorosilane was prepared.

The unique and advantageous aspects of the instant invention are further illustrated by the fact that other basic, nitrogen containing compounds, when substituted for isoquinoline or isoquinoline hydrochloride in the process, are not effective in dehydrochlorinating gamma-chloropropyl chlorosilane. For example, gamma-chloropropyl trichlorosilane was treated, in separate operations, with about 30% by weight of quinoline, pyridine and acridine in a manner identical to that disclosed in Example I. In the operation employing quinoline relatively small yields of allyl trichlorosilane were obtained over extremely long reaction periods. The results of this operation were such as to conclude that the preparation of allyl trichlorosilane by this method was not feasible. Those operations employing pyridine and acridine did not result in the preparation of sufficient product to warrant analysis.

Other basic nitrogen containing materials were also substituted for isoquinoline hydrochloride in the process. In each instance these operations proved unsuccessful in preparing allyl trichlorosilane. The compounds employed above included dimethylamine hydrochloride, hexamethylene tetramine, pyrrole, 2-methyl 5-ethyl pyridine, N-ethyl piperidine, adiponitrile, beta-naphthoquinoline, 2-chloropyridine and 3-cyanopyridine.

What is claimed is:

1. A process of dehydrochlorinating gamma-chloropropyl trichlorosilane which comprises heating said gamma-chloropropyl trichlorosilane with from about 5 per cent to about 40 per cent by weight of said chlorosilane of isoquinoline at a temperature of from about 180° C. to about 220° C. under reflux conditions and removing hydrogen chloride and allyl trichlorosilane from the reaction zone.

2. A process of dehydrochlorinating gamma-chloropropyl trichlorosilane which comprises heating said gamma-chloropropyl trichlorosilane with from about 5 per cent to about 40 per cent by weight of said chlorosilane of isoquinoline hydrochloride at a temperature of from about 180° C. to about 220° C. under reflux conditions and removing hydrogen chloride and allyl trichlorosilane from the reaction zone.

3. A process of dehydrochlorinating gamma-chloropropyl ethyl dichlorosilane which comprises heating said gamma-chloropropyl ethyl dichlorosilane with from about 5 per cent to about 40 per cent by weight of said chlorosilane of isoquinoline at a temperature of from about 180° C. to about 220° C. under reflux conditions and removing hydrogen chloride and allyl ethyl dichlorosilane from the reaction zone.

4. A process of dehydrochlorinating gamma-chloropropyl methyl dichlorosilane which comprises heating said gamma-chloropropyl methyl dichlorosilane with from about 5 per cent to about 40 per cent by weight of said chlorosilane of isoquinoline at a temperature of from about 180° C. to about 220° C. under reflux conditions and removing hydrogen chloride and allyl methyl dichlorosilane from the reaction zone.

5. A process of dehydrochlorinating a gamma-chloropropyl alkyl dichlorosilane which comprises heating said gamma-chloropropyl alkyl dichlorosilane with from about 5 per cent to about 40 per cent by weight of said dichlorosilane of isoquinoline at a temperature of from about 180° C. to about 220° C. under reflux conditions and removing hydrogen chloride and an allyl alkyl dichlorosilane from the reaction zone.

6. A process for the continuous dehydrochlorination of gamma-chloropropyl trichlorosilane which comprises continually feeding said gamma-chloropropyl trichlorosilane to a reaction vessel containing a mixture of said trichlorosilane and from about 5% to about 40% by weight of said trichlorosilane in the reaction vessel of isoquinoline, heating said mixture to a temperature of from about 180° C. to about 220° C. under reflux conditions and removing hydrogen chloride and allyl trichlorosilane from the reaction zone.

7. A process of dehydrochlorinating a gamma-chloropropyl chlorosilane taken from the class consisting of: (a) gamma-chloropropyl chlorosilanes which contain only gamma-chloropropyl groups and chlorine atoms bonded to the silicon atom thereof, and (b) gamma-chloropropyl chlorosilanes which contain only gamma-chloropropyl groups, alkyl groups and chlorine atoms bonded to the silicon atom thereof, which comprises heating said gamma-chloropropyl chlorosilane with from about 5 per cent to about 40 per cent by weight of said gamma-chloropropyl chlorosilane of isoquinoline at a temperature of from about 180° C. to about 220° C. to evolve hydrogen chloride and removing said evolved hydrogen chloride from the reaction zone.

8. A process of dehydrochlorinating a gamma-chloropropyl chlorosilane taken from the class consisting of: (a) gamma-chloropropyl chlorosilanes which contain only gamma-chloropropyl groups and chlorine atoms bonded to the silicon atom thereof, and (b) gamma-chloropropyl chlorosilanes which contain only gamma-chloropropyl groups, alkyl groups and chlorine atoms bonded to the silicon atom thereof, which comprises heating said gamma-chloropropyl chlorosilane with from about 5 per cent to about 40 per cent by weight of said gamma-chloropropyl chlorosilane of isoquinoline hydrochloride at a temperature of from about 180° C. to about 220° C. to evolve hydrogen chloride and removing said evolved hydrogen chloride from the recation zone.

9. A process of dehydrochlorinating a gamma-chloropropyl chlorosilane taken from the class consisting of: (a) gamma-chloropropyl chlorosilanes which contain only gamma-chloropropyl groups and chlorine atoms bonded to the silicon atom thereof, and (b) gamma-chloropropyl chlorosilances which contain only gamma-chloropropyl groups, alkyl groups and chlorine atoms bonded to the silicon atom thereof, which comprises heating said gamma-chloropropyl chlorosilanes with from about 5 per cent to about 40 per cent by weight of said gamma-chloropropyl chlorosilane of isoquinoline at a temperature of from about 180° C. to about 220° C. under reflux conditions and removing hydrogen chloride and an allyl chlorosilane from the reaction zone.

10. A process of dehydrochlorinating a gamma-chloropropyl chlorosilane taken from the class consisting of: (a) gamma-chloropropyl chlorosilanes which contain only gamma-chloropropyl groups and chlorine atoms bonded to the silicon atom thereof, and (b) gamma-chloropropyl chlorosilanes which contain only gamma-chloropropyl groups, alkyl groups and chlorine atoms bonded to the silicon atom thereof, which comprises heating said gamma-chloropropyl chlorosilane with from about 5 per cent to about 40 per cent by weight of said gamma-chloropropyl chlorosilane of isoquinoline hydrochloride at a temperature of from about 180° C to about 220° C. under reflux conditions and removing hydrogen chloride and an allyl chlorosilane from the reaction zone.

11. A process for the continuous dehydrochlorination of a gamma-chloropropyl chlorosilane taken from the class consisting of: (a) gamma-chloropropyl chlorosilanes which contain only gamma-chloropropyl groups and chlorine atoms bonded to the silicon atom thereof, and (b) gamma-chloropropyl chlorosilanes which contain only gamma-chloropropyl groups, alkyl groups and chlorine atoms bonded to the silicon atom thereof, which comprises continually feeding said gamma-chloropropyl chlorosilane to a reaction vessel containing a mixture of said chlorosilane and from about 5 per cent to about 40 per cent by weight of said chlorosilane in the reaction vessel of isoquinoline, heating said mixture to a temperature of from about 180° C. to about 220° C. and continually removing hydrogen chloride and an allyl chlorosilane from the reaction zone.

12. A process for the continuous dehydrochlorination of a gamma-chloropropyl chlorosilane taken from the class consisting of: (a) gamma-chloropropyl chlorosilanes which contain only gamma-chloropropyl groups and chlorine atoms bonded to the silicon atom thereof, and (b) gamma-chloropropyl chlorosilanes which contain only gamma-chloropropyl groups, alkyl groups and chlorine atoms bonded to the silicon atom thereof, which comprises continually feeding said gamma-chloropropyl chlorosilane to a reaction vessel containing a mixture of said chlorosilane and from about 5 per cent to about 40 per cent by weight of said chlorosilane in the reaction vessel of isoquinoline hydrochloride, heating said mixture to a temperature of from about 180° C. to about 220° C. under reflux conditions and continually removing hydrogen chloride and an allyl chlorosilane from the reaction zone.

References Cited in the file of this patent
UNITED STATES PATENTS
2,574,390     Hatcher                Nov. 6, 1951